United States Patent [19]

Fossum et al.

[11] Patent Number: 4,994,996
[45] Date of Patent: Feb. 19, 1991

[54] PIPELINED FLOATING POINT ADDER FOR DIGITAL COMPUTER

[75] Inventors: Tryggve Fossum, Northboro; William R. Grundmann, Hudson; Muhammad S. Hag, Shrewsbury, all of Mass.

[73] Assignee: Digital Equipment Corporation, Maynard, Mass.

[21] Appl. No.: 306,343

[22] Filed: Feb. 3, 1989

[51] Int. Cl.$^5$ .............................................. G06F 7/38
[52] U.S. Cl. ..................................... 364/748; 364/745
[58] Field of Search ....................... 364/748, 745, 715.1

[56] References Cited

U.S. PATENT DOCUMENTS

| | | | |
|---|---|---|---|
| 4,395,758 | 7/1983 | Helenius et al. | 364/200 |
| 4,562,553 | 12/1985 | Mattedi et al. | 364/745 |
| 4,592,006 | 5/1986 | Hagiwara et al. | 364/748 |
| 4,779,220 | 10/1988 | Nukiyama | 364/748 |
| 4,796,217 | 1/1989 | Takahashi et al. | 364/745 |
| 4,800,516 | 1/1989 | Si et al. | 364/748 |
| 4,858,165 | 8/1989 | Gronowski et al. | 364/748 |
| 4,864,527 | 9/1989 | Peng et al. | 364/748 |

OTHER PUBLICATIONS

Fossum et al., "An Overview of the VAX 8600 System", Digital Technical Journal, No. 1, Aug. 1985, pp. 8-23.
Fossum et al., "The F Box, Floating Point in the VAX 8600 System", Digital Technical Journal, No. 1, Aug. 1985, pp. 43-53.

Primary Examiner—Dale M. Shaw
Assistant Examiner—Tan V. Mai
Attorney, Agent, or Firm—Arnold, White & Durkee

[57] ABSTRACT

A system for subtracting two floating-point binary numbers in a pipelined floating-point adder/subtractor by aligning the two fractions for sustraction; arbitrarily designating the fraction of one of the two floating-point numbers as the subtrahend, and producing the complement of that designated fraction; adding that complement to the other fraction, normalizing the result; determining whether the result is negative and, if it is, producing the complement of the normalized result; and selecting the larger of the exponents of the two floating-point numbers, and adjusting the value of the selected exponent in accordance with the normalization of the result. The preferred system produces a sticky bit signal by aligning the two fractions for subtraction by shifting one of the two fractions to the right; determining the number of consecutive zeros in the one fraction, prior to the shifting thereof, beginning at the least significant bit position; comparing (1) the number of positions the one fraction is shifted in the aligning step, with (2) the number of consecutive zeros in the one fraction; and producing a sticky bit signal when the number of consecutive zeros is less than the number of positions the one fraction is shifted in the aligning stgep, ther sticky bit signal indicating the truncation of at least one set bit during the aligning step.

35 Claims, 6 Drawing Sheets

| INPUTS | | | | | | | | OUTPUTS | | |
|---|---|---|---|---|---|---|---|---|---|---|
| $B_7$ | $B_6$ | $B_5$ | $B_4$ | $B_3$ | $B_2$ | $B_1$ | $B_0$ | C | B | A |
| 0 | 0 | 0 | 0 | 0 | 0 | 0 | X | 0 | 0 | 0 |
| X | X | X | X | X | X | X | 1 | 0 | 0 | 0 |
| X | X | X | X | X | X | 1 | 0 | 0 | 0 | 1 |
| X | X | X | X | X | 1 | 0 | 0 | 0 | 1 | 0 |
| X | X | X | X | 1 | 0 | 0 | 0 | 0 | 1 | 1 |
| X | X | X | 1 | 0 | 0 | 0 | 0 | 1 | 0 | 0 |
| X | X | 1 | 0 | 0 | 0 | 0 | 0 | 1 | 0 | 1 |
| X | 1 | 0 | 0 | 0 | 0 | 0 | 0 | 1 | 1 | 0 |
| 1 | 0 | 0 | 0 | 0 | 0 | 0 | 0 | 1 | 1 | 1 |

8-BIT PRIORITY ENCODER
TRUTH TABLE

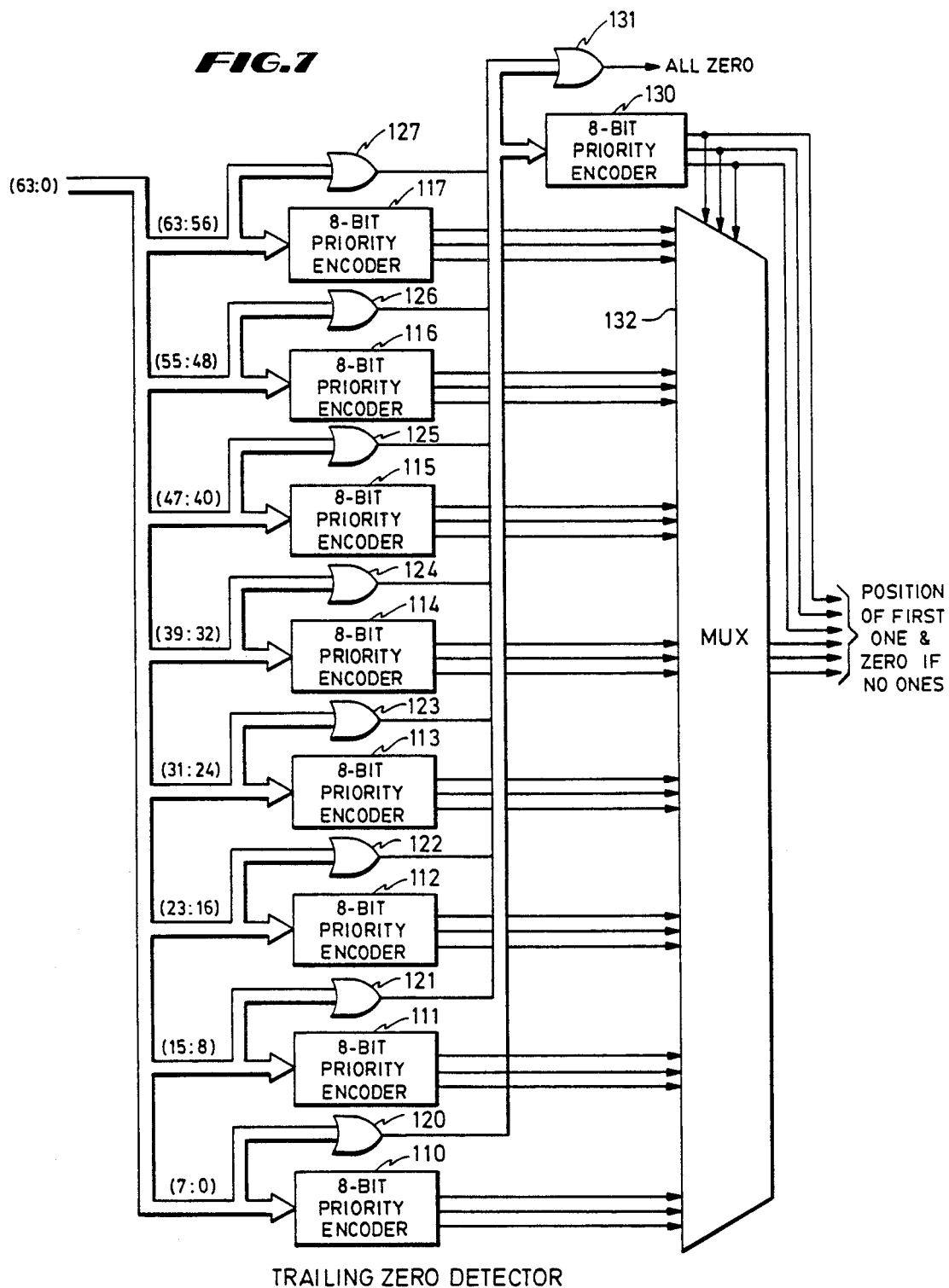

PIPELINED FLOATING POINT ADDER FOR DIGITAL COMPUTER

RELATED APPLICATIONS

The present application discloses certain aspects of a computing system that is further described in the following U.S. patent applications filed concurrently with the present application: Evans et al., AN INTERFACE BETWEEN A SYSTEM CONTROL UNIT AND A SERVICE PROCESSING UNIT OF A DIGITAL COMPUTER, Ser. No. 07/306,325 filed Feb. 3, 1989; Arnold et al., METHOD AND APPARATUS FOR INTERFACING A SYSTEM CONTROL UNIT FOR A MULTIPROCESSOR SYSTEM WITH THE CENTRAL PROCESSING UNITS, Ser. No. 07/306,837 filed Feb. 3, 1989; Gagliardo et al., METHOD AND MEANS FOR INTERFACING A SYSTEM CONTROL UNIT FOR A MULTI-PROCESSOR SYSTEM WITH THE SYSTEM MAIN MEMORY, Ser. No. 07/306,326 filed Feb. 3, 1989; D. Fite et al., METHOD AND APPARATUS FOR RESOLVING A VARIABLE NUMBER OF POTENTIAL MEMORY ACCESS CONFLICTS IN A PIPELINED COMPUTER SYSTEM, Ser. No. 07/306,767; D. Fite et al., DECODING MULTIPLE SPECIFIERS IN A VARIABLE LENGTH INSTRUCTION ARCHITECTURE, Ser. No. 07/307,347 filed Feb. 3, 1989; D. Fite et al., VIRTUAL INSTRUCTION CACHE REFILL ALGORITHM, Ser. No. 07/306,831 filed Feb. 3, 1989; Murray et al., PIPELINE PROCESSING OF REGISTER AND REGISTER MODIFYING SPECIFIERS WITHIN THE SAME INSTRUCTION, Ser. No. 07/306,833 filed Feb. 3, 1989; Murray et al., MULTIPLE INSTRUCTION PREPROCESSING SYSTEM WITH DATA DEPENDENCY RESOLUTION FOR DIGITAL COMPUTERS, Ser. No. 07/306,773 filed Feb. 3, 1989; Murray et al., PREPROCESSING IMPLIED SPECIFIERS IN A PIPELINED PROCESSOR, Ser. No. 07/306,846 filed Feb. 3, 1989; D. Fite et al., BRANCH PREDICTION, Ser. No. 07/306,760 filed Feb. 3, 1989; Grundmann et al., SELF TIMED REGISTER FILE, Ser. No. 07/306,445 filed Feb. 3, 1989; Beaven et al., METHOD AND APPARATUS FOR DETECTING AND CORRECTING ERRORS IN A PIPELINED COMPUTER SYSTEM, Ser. No. 07/306,828 filed Feb. 3, 1989; Flynn et al., METHOD AND MEANS FOR ARBITRATING COMMUNICATION REQUESTS USING A SYSTEM CONTROL UNIT IN A MULTI-PROCESSOR SYSTEM, Ser. No. 07/306,871 filed Feb. 3, 1989; E. Fite et al., CONTROL OF MULTIPLE FUNCTION UNITS WITH PARALLEL OPERATION IN A MICROCODED EXECUTION UNIT, Ser. No. 07/306,832 filed Feb. 3, 1989; Webb, Jr. et al., PROCESSING OF MEMORY ACCESS EXCEPTIONS WITH PREFETCHED INSTRUCTIONS WITHIN THE INSTRUCTION PIPELINE OF A VIRTUAL MEMORY SYSTEM-BASED DIGITAL COMPUTER, Ser. No. 07/306,866 filed Feb. 3, 1989; Hetherington et al., METHOD AND APPARATUS FOR CONTROLLING THE CONVERSION OF VIRTUAL TO PHYSICAL MEMORY ADDRESSES IN A DIGITAL COMPUTER SYSTEM, Ser. No. 07/306,544 filed Feb. 3, 1989; Hetherington et al., WRITE BACK BUFFER WITH ERROR CORRECTING CAPABILITIES, Ser. No. 07/306,703 filed Feb. 3, 1989; Flynn et al., METHOD AND MEANS FOR ARBITRATING COMMUNICATION REQUESTS USING A SYSTEM CONTROL UNIT IN A MULTI-PROCESSING SYSTEM, Ser. No. 07/306,871 filed Feb. 3, 1989; Chinnasway et al., MODULAR CROSSBAR INTERCONNECTION NETWORK FOR DATA TRANSACTIONS BETWEEN SYSTEM UNITS IN A MULTI-PROCESSOR SYSTEM, Ser. No. 07/306,336 filed Feb. 3, 1989; Polzin et al., METHOD AND APPARATUS FOR INTERFACING A SYSTEM CONTROL UNIT FOR A MULTI-PROCESSOR SYSTEM WITH INPUT/OUTPUT UNITS, Ser. No. 07/306,862 filed Feb. 3, 1989; Gagliardo et al., MEMORY CONFIGURATION FOR USE WITH MEANS FOR INTERFACING A SYSTEM CONTROL UNIT FOR A MULTI-PROCESSOR SYSTEM WITH THE SYSTEM MAIN MEMORY, Ser. No. 07/306,404 filed Feb. 3, 1989; and Gagliardo et al., METHOD AND MEANS FOR ERROR CHECKING OF DRAM-CONTROL SIGNALS BETWEEN SYSTEM MODULES, Ser. No. 07/306,836 filed Feb. 3, 1989.

TECHNICAL FIELD

The present invention relates generally to floating point processors for use in digital computers and, more particularly, to an improved pipelined floating point adder/subtractor.

DESCRIPTION OF RELATED ART

A floating-point number is a sequence of contiguous bits representing the fraction FRAC (or mantissa), the exponent EXP, and the sign S of a number N defined by the formula:

$$N = FRAC * 2^{EXP} * (-1)^S$$

A typical 64-bit format for representing a floating-point number is shown in the following table:

| 15 | 14 | | 7 | 6 | | 0 | |
|---|---|---|---|---|---|---|---|
| S | EXPONENT | | | FRACTION | | | :A |
| | FRACTION | | | | | | :A + 2 |
| | FRACTION | | | | | | :A + 4 |
| | FRACTION | | | | | | :A + 6 |
| 63 | | | | | | 48 | |

The fraction FRAC is expressed as a 53-bit positive fraction, with the binary point positioned to the left of the most significant bit. If the fraction FRAC is not zero, the most significant bit of FRAC must be 1, so this bit is not stored; this bit is referred to as the "hidden bit" and enables FRAC to be expressed in 52 bits rather than 53. One of the remaining twelve bits is used to express the sign S, and the other eleven bits are used to express the exponent EXP.

As is well known, the binary points of two floating-point numbers must be aligned before adding or subtracting the two numbers. This alignment is accomplished b comparing the relative magnitudes of the two exponents $|EXP_1|$ and $|EXP_2|$ and then shifting the fraction with the smaller exponent $(EXP_1 - EXP_2)$ places to the right. The two fractions can then be added or subtracted, i.e., $FRAC_1 \pm FRAC_2$, with the larger exponent serving as the exponent of the result. (In subtraction, the two's complement of the subtrahend is added to the minuend.) The resulting sum is then normalized by shifting the fraction to the left until the most significant bit is a 1, and decreasing the exponent accordingly. Finally, the result is rounded, e.g., by adding a rounding constant.

The steps described above work in a pipelined floating-point adder/subtractor if the exponents are different. If the exponents are of equal size, however, it is not known which number is smaller, which can be a problem in subtraction. One technique for subtracting numbers having exponents of equal size is to initially guess which number is smaller, but if the guess is wrong, an extra addition step is required to obtain the correct number. Another technique is to use two adders and perform the subtraction both ways, and then select the correct fraction in a subsequent step. This technique has the disadvantage of requiring two adders, and may result in extra pin requirements on integrated circuits, and extra loads on critical signals.

Another problem encountered in a pipelined floating-point adder/subtractor is the "sticky bit" problem, i.e., the loss of a one to the right of the least significant bit of a shifted number, due to truncation during alignment of that number. If there is no compensation for this loss, the addition/subtraction operation can produce an inaccurate result.

SUMMARY OF THE INVENTION

There is provided a system for subtracting two floating-point binary numbers by aligning the two fractions for subtraction, arbitrarily designating the fraction of one of the two floating-point numbers as the subtrahend, producing the complement of the designated fraction and adding that complement to the other fraction, normalizing the result, determining whether the result is negative and, if it is, producing the complement of the normalized result, selecting the larger of the exponents of the two floating-point numbers, and adjusting the value of the selected exponent in accordance with the normalization of the result.

There is also provided a system for producing a sticky bit signal by aligning the two fractions for subtraction by shifting one of the two fractions to the right, determining the number of consecutive zeros in the one fraction, prior to the shifting thereof, beginning at the least significant bit position, comparing (1) the number of positions the one fraction is shifted in the aligning step, with (2) the number of consecutive zeros in the one fraction, and producing a sticky bit signal when the number of consecutive zeros is less than the number of positions the one fraction is shifted in the aligning step, the sticky bit signal indicating the truncation of at least one set bit during the aligning step.

BRIEF DESCRIPTION OF THE DRAWINGS

Other objects and advantages of the invention will become apparent upon reading the following detailed description and upon reference to the drawings in which:

FIG. 7 is a schematic diagram of the trailing zero detector included in the circuit of FIG. 6.

Figure 1:
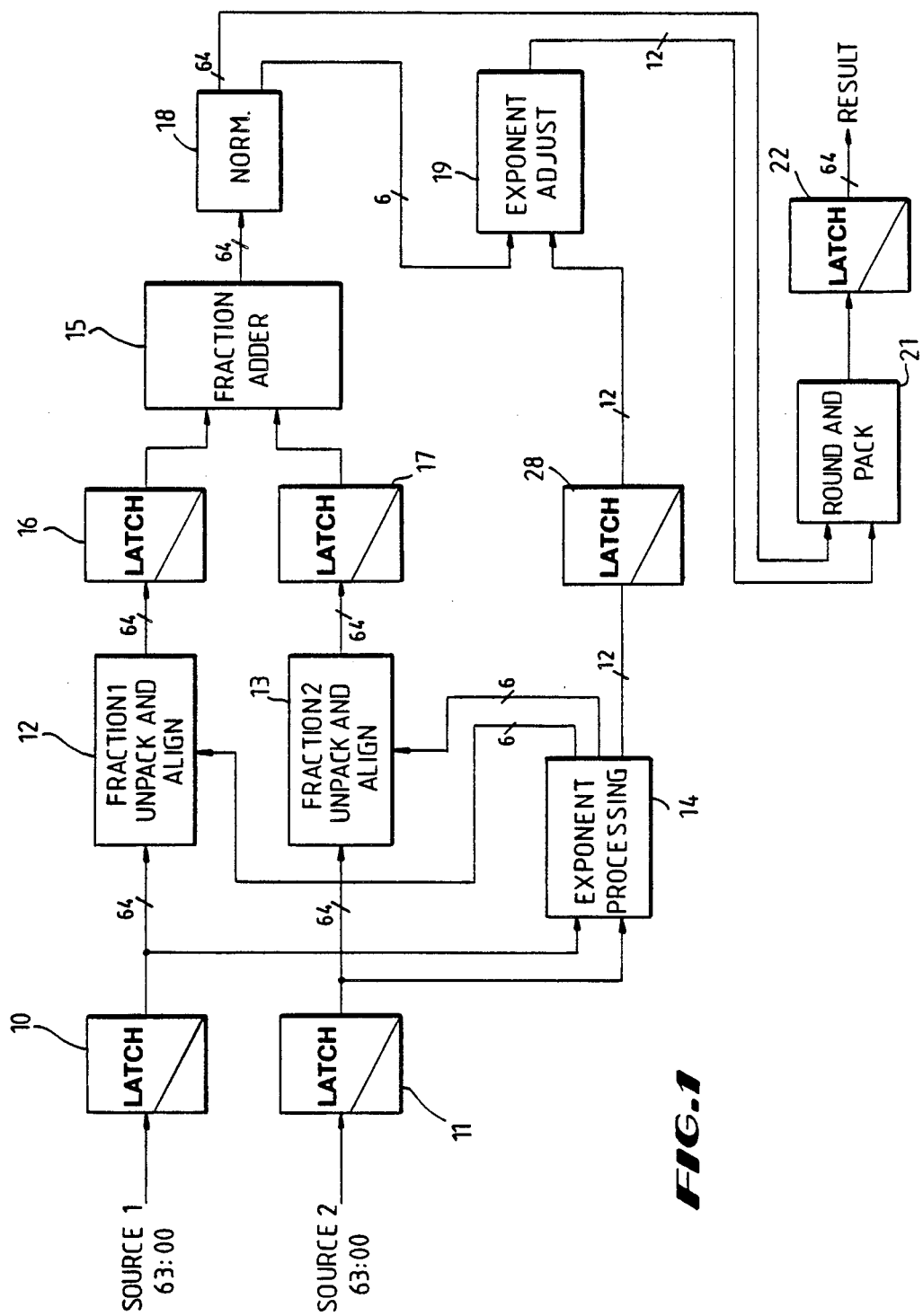
FIG. 1 is a block diagram of a floating point adder embodying the present invention.

While the invention is susceptible to various modifications and alternative forms, specific embodiments thereof have been shown by way of example in the drawings and will herein be described in detail. It should be understood, however, that it is not intended to limit the invention to the particular forms disclosed, but on the contrary, the intention is to cover all modifications, equivalents, and alternatives falling within the spirit and scope of the invention as defined by the appended claims.

DESCRIPTION OF THE PREFERRED EMBODIMENTS

Turning now to the drawings and referring first to FIG. 1, two source operands $SOURCE_1$ and $SOURCE_2$, each of which comprises a 64-bit floating-point number, are supplied via latches 10 and 11 to a pair of fraction alignment units 12 and 13. The operand $SOURCE_1$ comprises a 52-bit fraction $FRAC_1$, an 11-bit exponent $EXP_1$, and a sign bit $S_1$. Similarly, the operand $SOURCE_2$ comprises a 52-bit fraction $FRAC_2$, an 11-bit exponent $EXP_2$, and a sign bit $S_2$. It will be understood that the illustrative system can also process floating-point numbers in other formats.

As explained previously, the binary points of the two source operands must be aligned before meaningful addition or subtraction can be performed. This alignment is effected in the two alignment units 12 and 13, which initially extract the fractions $FRAC_1$ and $FRAC_2$ from the source operands $SOURCE_1$ and $SOURCE_2$. The alignment is then accomplished by shifting the fraction with the smaller exponent a prescribed number of places to the right; this prescribed number is equal to the difference between the two exponents, as determined by an exponent processing unit 14.

The exponent processing unit 14 receives the two operands $SOURCE_1$ and $SOURCE_2$ from the latches 10 and 11, extracts the eleven exponent bits $EXP_1$ and $EXP_2$ from the respective operands, and produces a pair of 6-bit control signals for the two fraction alignment units 12 and 13. (In actual practice, each of the two alignment units 12 and 13 can contain its own exponent subtractor.) These 6-bit control signals determine which of the fractions $FRAC_1$ and $FRAC_2$, if any, is to be shifted in the alignment units 12 and 13, and the magnitude of the shift. The control signal supplied to the $FRAC_1$ alignment unit 12 is zero if $EXP_1$ is greater than $EXP_2$, and is equal to the difference between the two exponents if $EXP_2$ is greater than or equal to $EXP_1$; thus, the fraction $FRAC_2$ is shifted to the right by a number of positions equal to the difference between $EXP_1$ and $EXP_2$ if $EXP_2$ is greater than $EXP_1$. The control signal supplied to the $FRAC_2$ alignment unit is zero if $EXP_2$ is greater than or equal to $EXP_1$, and is equal to the difference between the two exponents if $EXP_1$ is greater than $EXP_2$; thus, the fraction $FRAC_2$ is shifted to the right by a number of positions equal to the difference between $EXP_1$ and $EXP_2$ if $EXP_1$ is greater than $EXP_2$. The net effect of these control signals, therefore, is to shift the fraction of the source operand having the smaller exponent the proper number of binary places to permit the fractions of the two source operands to be added or subtracted.

From the alignment units 12 and 13, the two aligned fractions $FRAC_1$ and $FRAC_2$ are passed to a fraction adder 15 through a pair of latches 16 and 17. As already mentioned, and as will be described in more detail below, the adder 15 can be used to either add or subtract the two fractions $FRAC_1$ and $FRAC_2$.

The sum $FRAC_S$ produced by the adder 15 is passed to a normalization unit 18 which shifts the sum $FRAC_S$ to the left by the requisite number of positions to normalize $FRAC_{FRACS}$. At the same time the normalization unit supplies a control signal to an exponent adjust unit 19, which receives the greater of the two exponents $EXP_1$ and $EXP_2$ via a latch 20. This greater exponent is referred to hereinafter as the sum exponent $EXP_S$. The purpose of the exponent adjust unit 19 is to decrease $EXP_S$ by a number equal to the number of positions that $FRAC_S$ is shifted to the left in the normalization unit 18. Both the output FRACN of the normalization unit 18 and the output $EXP_N$ of the exponent adjust unit 19 are supplied to a rounding unit 21 which rounds the result by adding a rounding constant. The final fraction FRACF and the final exponent $EXP_F$ are then packed to form a result, which is supplied to a latch 22.

Figure 2:
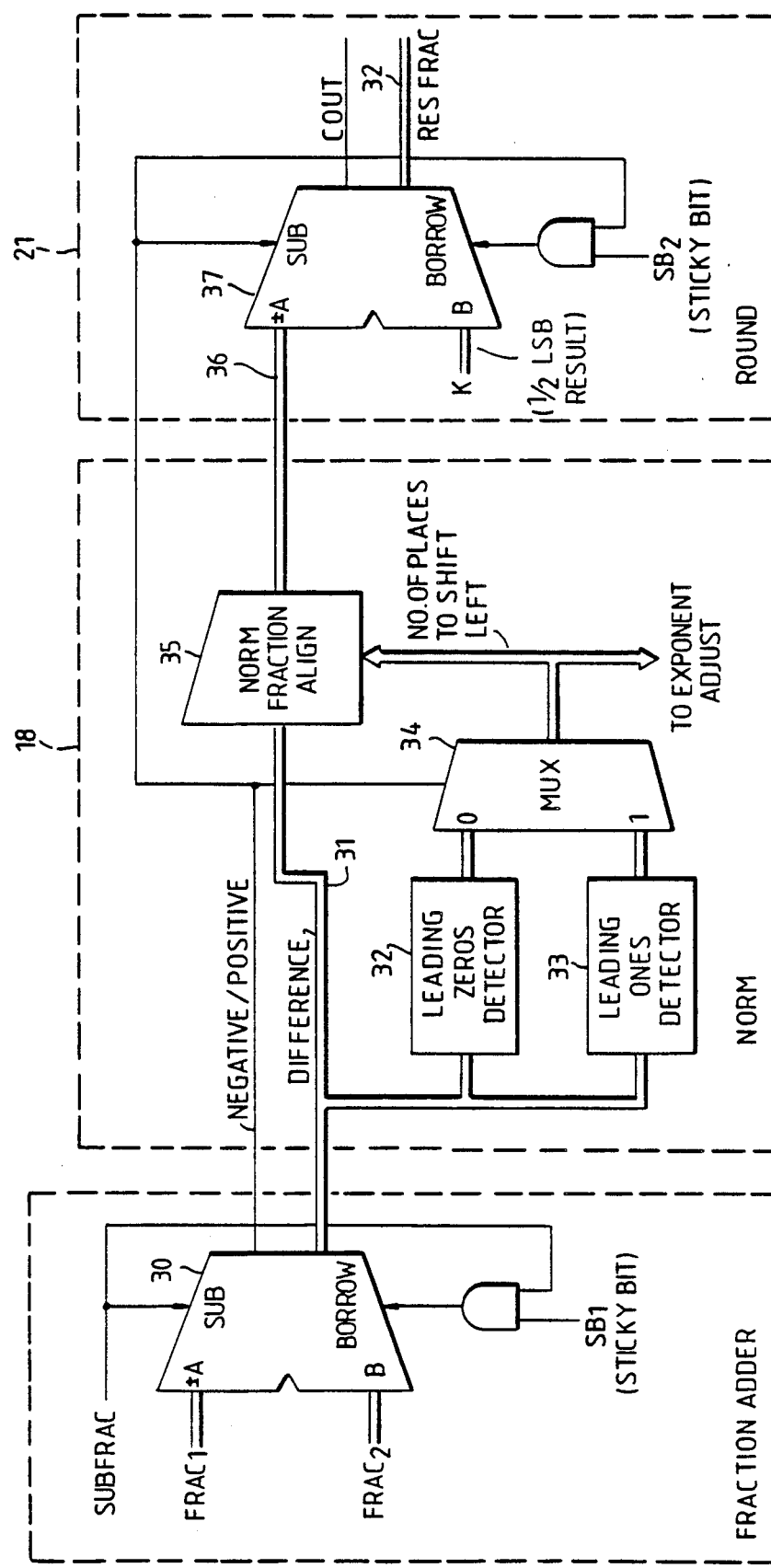
FIG. 2 is a schematic diagram of the fraction adder, normalization unit and rounding unit in the adder of FIG. 1.

Referring now to FIG. 2, the operation of the adder 15, the normalization unit 18 and the rounding unit 21 will be described in more detail in connection of the schematic diagram of these three units in FIG. 2. For an addition operation in the fraction adder 15, the two 64-bit, aligned fractions $FRAC_1$ and $FRAC_2$ are simply summed in a conventional adder 30. For a subtraction operation, the control input SUBFRAC at a subtraction input terminal SUB is asserted to cause the complement of $FRAC_1$ to be added to $FRAC_2$, i.e., $FRAC_1$ is subtracted from $FRAC_2$. It is important to note that $FRAC_1$ may always be arbitrarily designated as the subtrahend, regardless of whether $FRAC_1$ is larger or smaller than $FRAC_2$, because negative results can be correctly handled by the system. Consequently, floating-point numbers having equal exponents can be added or subtracted using a single adder, performing a single addition operation. The result produced by the adder 30 is passed over a bus 31 to the normalization unit 18.

As will be described in more detail below, the adder 30 also produces a control output signal $-/+$ which indicates whether the number on bus 31 is positive or negative. This control signal $-/+$ is asserted for a negative result.

In the normalization unit 18, the number on the bus 31 is received by both a leading-zeros detector 32 and a leading-ones detector 33. It will be recalled that normalizing a positive floating-point number requires shifting the fraction to the left to push off the leading zeros (in the most significant bit positions) until a one appears in the most significant bit position. In the case of negative numbers, a complementary normalizing operation is performed, i.e., the fraction is shifted to the left to push off the leading ones until a zero appears in the most significant bit position. Thus, in the system of FIG. 2 the leading-zeros detector 32 is used to determine the number of left shifts required to normalize positive numbers, and the leading-ones detector 33 does the same for negative numbers. In the special case where the number on the bus 31 is all ones, the leading-ones detector 33 gives an erroneous result, but this error is subsequently corrected by the ensuing overflow signal in the rounding unit 21, as will be described in more detail below.

The outputs of the two detectors 32 and 33 are passed to a multiplexer 34 which selects the output of one of the two detectors in response to the signal $-/+$. That is, the output of the leading-ones detector 33 is selected if the signal $-/+$ is asserted, indicating that the number on the bus 31 is negative. If the signal $-/+$ is not asserted, the multiplexer 34 selects the output of the leading-zeros detector 32. From the multiplexer 34, the selected detector output is supplied to a shifter 35 which receives the number from the bus 31 and shifts that number to the left by the number of positions dictated by the control signal from the multiplexer 34. The resulting normalized number FRACN is then passed over a bus 36 to the rounding unit 21. The shifter 35 will be described in more detail below in connection with FIG. 5.

The output of the multiplexer 34 is also supplied to the exponent adjust unit 19 shown in FIG. 1. In the exponent adjust unit 19, the exponent $EXP_S$ is decremented by one for each left shift of the fraction $FRAC_S$ in the shifter 35.

Returning to FIG. 2, the rounding unit 21 includes an adder 37 which adds a rounding constant K to the fraction FRACN received on the bus 36. The constant K is equal to one-half of the least significant bit in $FRAC_S$. The resulting rounded number $FRAC_F$ is produced on an output bus 38 from the adder 37, as a 64-bit normalized, rounded, floating-point binary number.

It will be appreciated from the description thus far that in a subtraction operation, the fraction $FRAC_1$ is always subtracted from the fraction $FRAC_2$, regardless of whether $FRAC_1$ is larger or smaller than $FRAC_2$. Consequently, when $FRAC_1$ is larger than $FRAC_2$, the result of the subtraction operation will be negative, and the control signal $-/+$ will be asserted. The negative result will also be the complement of the true difference between $FRAC_1$ and $FRAC_2$. Thus, the signal $-/+$ is applied to a subtraction input terminal SUB of the adder 37 so that when a negative result is indicated by assertion of the signal $-/+$, the complement of $FRAC_N$ is added to the rounding constant K in the adder 37. The adder 37 also produces a carry-out signal $C_{out}$ which determines whether the adjusted value of EXP is increased by one or two, as will be described below in connection with FIG. 3.

Figure 3:
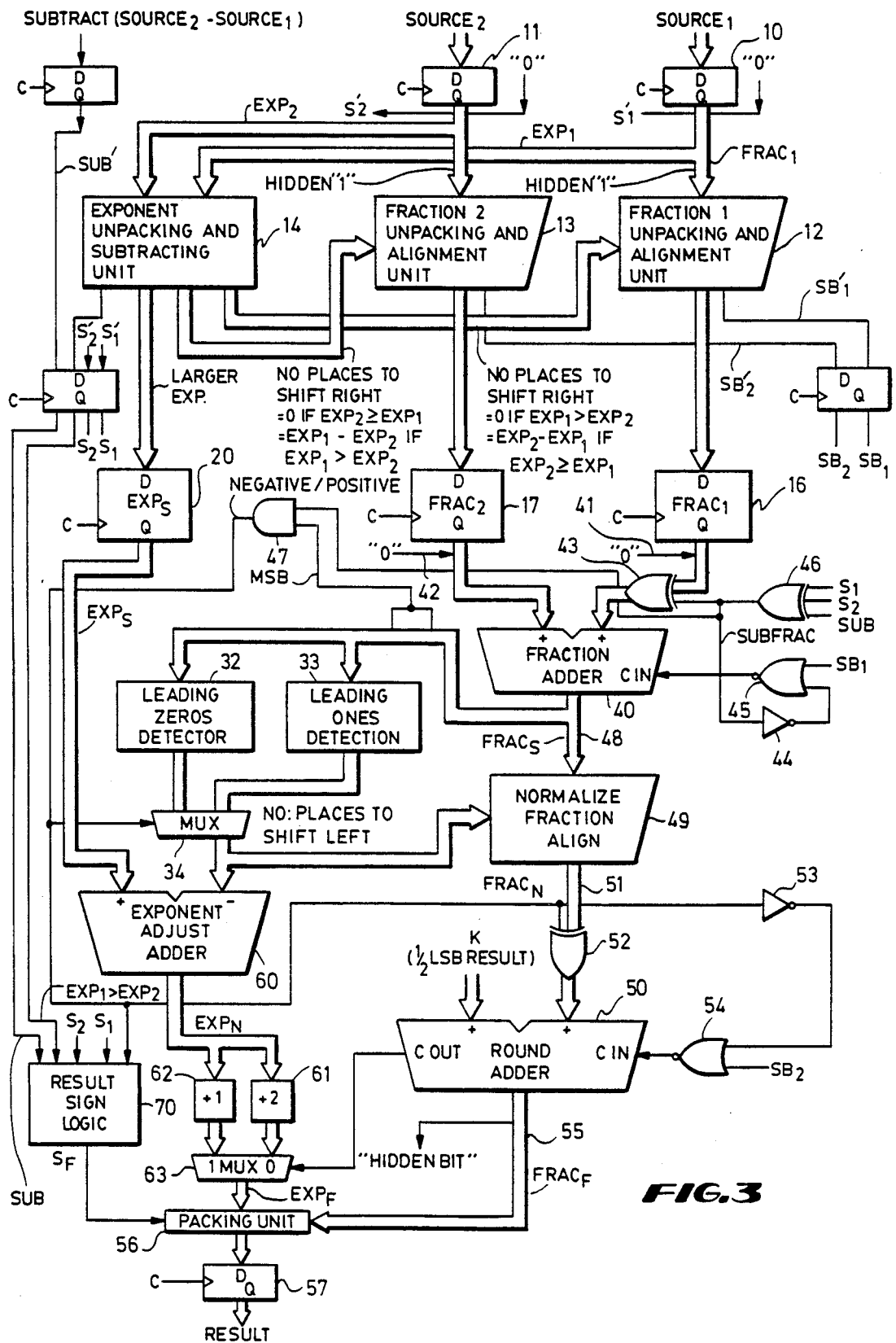
FIG. 3 is a more detailed schematic diagram of the entire adder, shown in FIG. 1.

Referring now to FIG. 3, the two latches 10 and 11 which receive the respective source operands $SOURCE_1$ and $SOURCE_2$, the two fraction alignment units 12 and 13, and the exponent processing unit 14, have already been described above in connection with FIG. 1. FIG. 3 also shows sticky-bit output signals $SB_1$ and $SB_2$ from the respective fraction alignment units 12 and 13, and the generation and processing of these sticky bit signals will be described below.

The outputs of the two fraction alignment units 12 and 13 are fed to the respective latches 16 and 17, and the clock inputs C to these latches then control when the two aligned fractions $FRAC_1$ and $FRAC_2$ are supplied to a fraction adder 40. While these numbers are being passed from the registers 16 and 17 to the adder 40, a leading zero is inserted into each number as the most significant bit, via lines 41 and 42. These added zeros are "overflow bits" which serve as placeholders to receive extra bits produced as a result of the addition performed in the fraction adder 40, i.e., to allow for a sum that is greater than or equal to one.

The number $FRAC_1$ from the register 16 is passed through an exclusive OR gate 43, which also receives the control signal SUBFRAC which is asserted when the two numbers $FRAC_1$ and $FRAC_2$ are to be subtracted rather than added in the adder 40. The assertion of this signal SUBFRAC causes the number $FRAC_1$ to be applied to the adder 40 in complement form rather than true form. Specifically, the gate 43 inverts the number $FRAC_2$, and a one is supplied to the carry-in of the adder 40 by the signal SUBFRAC via inverter 44 and NOR gate 45, thereby producing the two's complement of $FRAC_1$ for addition to $FRAC_2$.

The signal SUBFRAC is produced by an exclusive OR gate 46 which receives three input signals: a subtraction signal SUB indicating that the source operand $SOURCE_1$ is to be subtracted from the source operand $SOURCE_2$, and the two sign bits $S_1$ and $S_2$ of the two source operands. This combination of input signals causes the output of the gate 46, i.e., the signal SUB-$FRAC_1$, to be asserted whenever (1) SUB is asserted and $S_1$ and $S_2$ are the same, or (2) SUB is not asserted but $S_1$ and $S_2$ are different. These are, of course, the conditions in which $FRAC_1$ and $FRAC_2$ must be processed as having opposite signs.

The subtraction signal SUBFRAC is not only supplied to the adder 40 (via inverter 44 and gate 45), but also to an AND gate 47 for generating the signal $-/+$. The second input to the AND gate 47 is the most significant bit in the output of the adder 40; when this bit is set, it indicates that the output of the adder 40 is a negative number. Thus, assertion of the signal $-/+$ indicates that the sum $FRAC_S$ produced by the fraction adder 40 must be converted to its complement form to obtain the desired arithmetic result. The manner in which this is accomplished will be described below.

The output of the fraction adder 40 is supplied via bus 48 to a shifter 49 (corresponding to the shifter 35 described above), and then on to a rounding adder 50 via bus 51. Between the shifter 49 and the adder 50, the normalized result $FRAC_N$ is passed through an exclusive OR gate 52 which receives the signal $-/+$ from the AND gate 47. The assertion of the signal $-/+$ causes the normalized result $FRAC_R$ on the bus 51 to be applied to the adder 50 in complement form rather than true form. More specifically, the gate 52 inverts the $FRAC_N$, and a one is supplied to the carry-in of the adder 50 by the signal $-/+$ via an inverter 53 and a NOR gate 54, thereby producing the two's complement of $FRAC_N$. The output of the rounding adder represents the final value $FRAC_F$ of the fraction of the floating-point number representing the actual difference between the two original source operands $SOURCE_1$ and $SOURCE_2$. This number $FRAC_F$ is supplied via bus 55 to a packing unit 56 and then a latch 57.

Because the hidden bit is a part of the true value of each of the fractions $FRAC_1$ and $FRAC_2$, this bit must be restored to each fraction before it is processed in the adder/subtractor. Thus, as illustrated in FIG. 3, the hidden bits are restored to the two fractions before they enter the respective alignment units 12 and 13. Then when the final fraction value $FRAC_F$ is produced by the rounding adder 50, the hidden bit is removed again before the final value is packed with the final exponent value and sign.

Turning next to the processing of the exponent number EXP selected by the exponent processing unit 14 and fed to the latch 20, the clock signal applied to the latch 20 determines when this number is passed to the exponent adjust unit 19 (see FIG. 1). In FIG. 3 the exponent adjust unit 19 includes an adder 60 in which the number $EXP_S$ is decremented by a number equal to the number of positions by which the number $FRAC_S$ is shifted in the normalization unit 49. The decrementing number is determined in the same manner described in connection with FIG. 2, using the detectors 32 and 33 and the multiplexer 34.

From the exponent-adjusting adder 60, the adjusted exponent number $EXP_N$ is passed through a pair of adders 61 and 62 which increase the value of the number $EXP_N$ by one and two, respectively. The value of $EXP_N$ must always be increased by one because of the addition of the overflow bit to each of the fractions $FRAC_1$ and $FRAC_2$ before they entered the adder 40. When an overflow is produced in the rounding adder 50, the value of $EXP_N$ must be increased by two; this also corrects the error introduced by the leading ones detector 33 in the special case discussed above, where the number fed to the detector 33 is all ones.

To select between the two adders 61 and 62, the outputs of the two adders are supplied to a multiplexer 63, whose select input receives the carry-out from the rounding adder 50. When this carry-out is asserted, the multiplexer 63 selects the output of the adder 62 rather than the adder 61, so that the number $EXP_N$ from the adder 60 is increased by two rather than one. The output of the multiplexer 63 is a number $EXP_F$ which is the final value of the exponent for the floating-point number representing the actual difference between the two original source operands $SOURCE_1$ and $SOURCE_2$.

The sign of the ultimate result of the system shown in FIG. 3 is determined by result sign logic 70. This logic receives as input signals the subtraction signal SUB, a signal from the exponent processing unit 14 indicating whether $EXP_1$ is greater than $EXP_2$, the two sign bits $S_1$ and $S_2$ of the two source operands, and the $-/+$ signal from the gate 47.

The absolute value of the operand $SOURCE_1$ is greater than the absolute value of the operand $SOURCE_2$ when either (1) $EXP_1$ is greater than $EXP_2$ or (2) $EXP_1$ and $EXP_2$ are equal and the signal $-/+$ is asserted. When the absolute value of $SOURCE_1$ is greater than the absolute value of $SOURCE_2$, and $SOURCE_1$ is being added to $SOURCE_2$, the sign SF of the result should be the sign $S_1$ of $SOURCE_1$. Thus, the sign bit $S_1$ is passed through the logic 70 and becomes the sign bit SF of the ultimate result of the floating-point addition operation. When the absolute value of $SOURCE_1$ is less than the value of the absolute value of $SOURCE_2$, and $SOURCE_1$ and $SOURCE_2$ are being added, the logic 70 produces a result sign SF which is the same as the sign S2 of $SOURCE_2$.

When $SOURCE_1$ is being subtracted from $SOURCE_2$, the signal SUB is asserted. Now if the absolute value of $SOURCE_1$ is also greater than the absolute value of $SOURCE_2$, the result sign SF is the opposite of $S_1$. If the absolute value of $SOURCE_1$ is smaller than the absolute value of $SOURCE_2$, the result sign SF is the same as $S_2$.

Figures 4, 8:
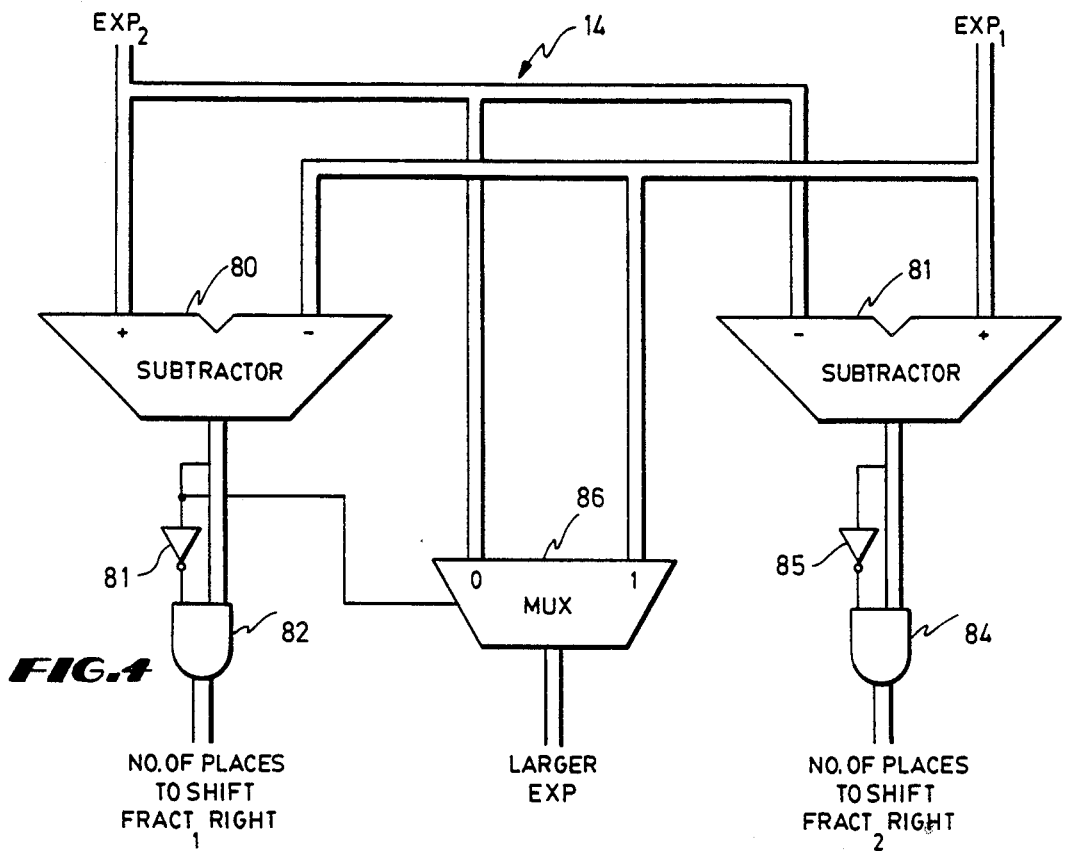
FIG. 4 is a schematic diagram of the exponent processing unit in the system of FIG. 3.
FIG. 8 is a truth table for the eight-bit priority encoders used in the circuit illustrated in FIG. 7.

A preferred circuit for the exponent processing unit 14 is shown in FIG. 4. This circuit includes two exponent subtractors 80 and 81, each of which recieves the two exponents $EXP_1$ and $EXP_2$. The use of the two subtractors makes it possible to physically package one of the subtractors with each of the alignment units 12 and 13. In both subtractors, a one is added to the most significant position of each input to restore the bias bit.

A positive output from either of the two subtractors 80 and 81 is an indication that the exponent supplied to that subtractor as a minuend is larger than the exponent supplied to that subtractor as a subtrahend. Consequently, the numerical value of the positive output of that adder represents the number of places that the fraction corresponding to the exponent supplied to that adder as a subtrahend should be shifted to the right for alignment purposes. In the case of the subtractor 80, this output is furnished by an AND gate 82 which receives the numerical output of the subtractor 80 as one input and the complement of the sign bit as a second input, via an inverter 83. The output of the AND gate 82 is supplied to the fraction alignment unit 12 to control the number of left shifts of the fraction $FRAC_1$. If the output of the subtractor 80 is negative, the sign bit is a one which, when inverted by the inverter 83, disables the AND gate 82 so that the fraction FRAC1 is not shifted.

In the case of the subtractor 81, the output is converted to an input signal for the fraction alignment unit 13 by an AND gate 84 which receives the numerical output of the subtractor 81 as one input and the complement of the sign bit as a second input, via an inverter 85. When $EXP_1$ is larger than $EXP_2$, the output of the AND gate 84 controls the number of left shifts of the fraction $FRAC_2$ in the alignment unit 13. If the output of the adder 81 is negative, the sign bit is a one which, when inverted by the inverter 85, disables the AND gate 84 so that the fraction $FRAC_2$ is not shifted.

The circuit of FIG. 4 also includes a multiplexer 86 which receives the two exponent values $EXP_1$ and $EXP_2$. The sign bit from the output of the subtractor 80 operates the select line of the multiplexer 86 so that it selects the exponent $EXP_2$ as the larger exponent when the sign bit from the subtractor 80 is positive, and selects the exponent $EXP_1$ when the sign bit from the subtractor 80 is negative. The particular exponent appearing at the output of the multiplexer 86 is then the larger of the two exponents. This is the exponent value $EXP_S$ and, after any adjustments made in the adders 60 and 61 or 62, becomes the final exponent value $EXP_F$.

Figure 5:
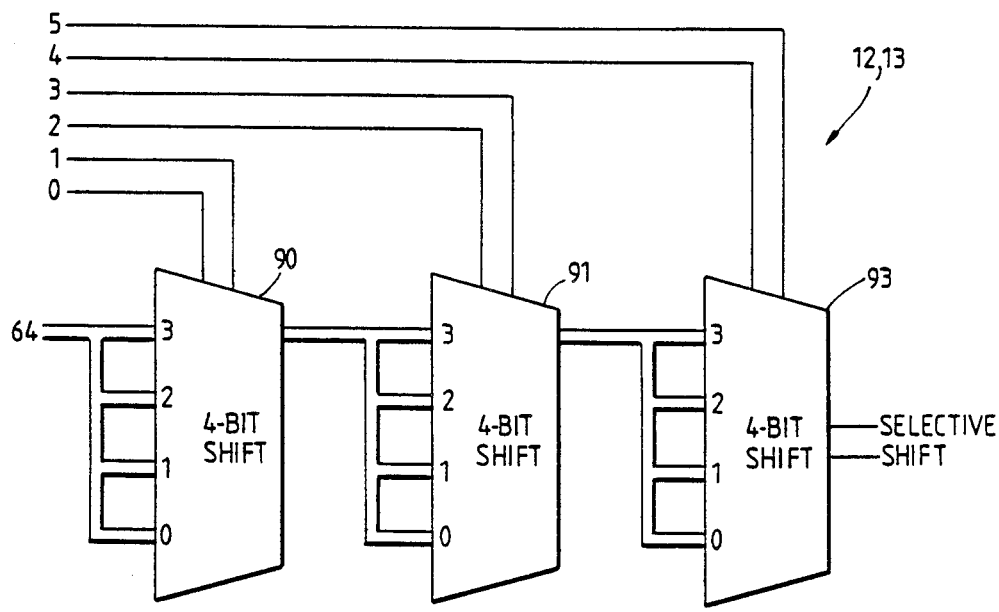
FIG. 5 is a schematic diagram of a shifter used in the fraction alignment units included in the system of FIG. 3.

A preferred circuit for one of the fraction alignment units 12 or 13 is illustrated in FIG. 5. This circuit receives the output of one of the AND gates 82 or 84 and supplies successive pairs of the six least significant bits of that output to three 4-bit-shift multiplexers 90, 91 and 92. The 64 bits of one of the fractions $FRAC_1$ or $FRAC_2$ are supplied to the first multiplexer 90 and, if there is a one present on any of the two control inputs to this multiplexer, the 64 bits are shifted accordingly.

Specifically, the multiplexer 90 can shift the fraction by 1, 2 or 3 positions; the multiplexer 91 by 4, 8 or 12 positions; and the multiplexer 92 by 16, 32 or 48 positions. For example, the presence of a one in the least significant bit position in the output of the exponent processing unit indicates that the two exponents $EXP_1$ and $EXP_2$ differ by at least one, and thus the fraction $FRAC_1$ or $FRAC_2$ is shifted by one position in the multiplexer 90. The shifted number is then passed on to the 4-bit-shift multiplexer 91 which shifts the number by bit positions according to the two control inputs received by that multiplexer. For example, the presence of a one in the more significant bit position in the two inputs to the multiplexer 91 indicates that the two exponents $EXP_1$ and $EXP_2$ still differ by at least eight. Consequently, the fraction $FRAC_1$ or $FRAC_2$ received by the multiplexer 91 is shifted by eight additional bit positions in response to this particular control input signal.

When the two exponents $EXP_1$ and $EXP_2$ are equal, both the AND gates 82 and 84 produce a zero output, and thus zeros are supplied to all six control inputs to the multiplexers 90–92. Consequently, the two fractions $FRAC_1$ and $FRAC_2$ are not shifted at all.

Figure 6:
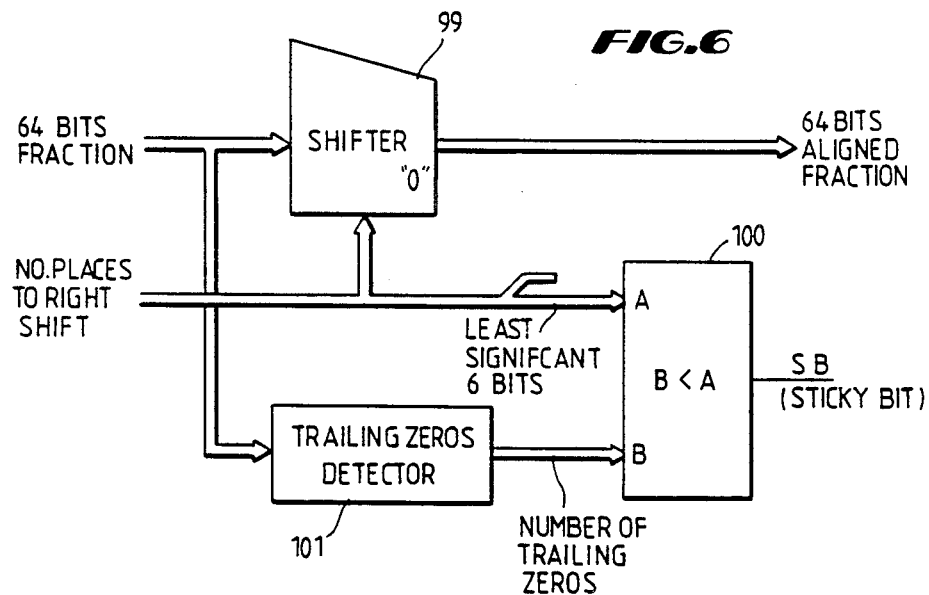
FIG. 6 is a schematic diagram of one of the fraction alignment units included in the system of FIG. 3.

If ones are present on all six control inputs to the multiplexers 90–92, the fraction $FRAC_1$ or $FRAC_2$ will be shifted a total of 63 positions. Whenever one of the fractions $FRAC_1$ or $FRAC_2$ is shifted in one of the alignment units 12 or 13, there is a possibility that a one to the right of the least significant bit of the shifted fraction will be "thrown away" as a result of truncation of that fraction. When this occurs, the alignment unit 12 or 13 in which the shift is effected generates a "sticky bit" signal $SB_1$ or $SB_2$ which is used later to compensate for the loss of the bit by truncation. The circuitry for generating this signal $SB_1$ or $SB_2$ in the alignment units 12 and 13 is illustrated in FIG. 6. The fraction shifter 99 in this circuit is the shifter shown in FIG. 5.

In the alignment unit of FIG. 6, the same six bits supplied as control signals to the multiplexers 90–92 in the shifter, to control up to 63 bit shifts, are supplied to a comparator 100 as input A. Input B to the comparator 100 is derived from a trailing-zeros detector 101 which determines the number of consecutive zeros in the 64bit fraction, beginning at the least significant bit position. If input B is less than input A, then the number of bit shifts exceeds the number of trailing zeros, which means that a one has been lost in the truncation of the fraction being shifted. Consequently, the comparator 100 asserts an output signal which is the sticky bit signal SB.

The sticky bit signal SB1 from the alignment unit 12 for $FRAC_1$ is supplied to the NOR gate 45 that applies the signal SUBFRAC to the carry-in of the fraction adder 40. When the signal $SB_1$ is asserted, it blocks the application of a carry-in signal to the adder 40, thereby compensating for the truncation of a set bit in the alignment unit 12.

The sticky bit signal from the alignment unit 13 for $FRAC_2$ is supplied to the NOR gate 54 that applies the signal $-/+$ to the carry-in of the rounding adder 50. When the signal $SB_2$ is asserted, it blocks the application of a carry-in signal to the adder 50, thereby compensating for the truncation of a set bit in the alignment unit 13.

Preferred circuitry for the trailing zeros detector 101 is shown in FIG. 7. In this circuit, successive bytes of the 64-bit fraction are supplied to eight different 8-bit priority encoders 110–117, and to eight different OR gates 120–127. The outputs of the OR gates 120–127 are all supplied to an 8-bit priority encoder 130 and to an OR gate 131. Each of the encoders produces a 3-bit output representing the position of the first one in its input byte, according to the truth table in FIG. 8. These eight 3-bit outputs are all supplied to a multiplexer 132. The encoder 130 produces a 3-bit output representing the position of the first one in its 8-bit input, and this 3-bit output is supplied to the select input of the multiplexer 132. Thus, the encoder 130 selects the first of the encoders 110–117 to detect a one, beginning with the encoder 110 which receives the least significant byte, and the multiplexer passes the 3-bit output of that selected encoder. Then the output of the multiplexer combined with the output of the encoder 130, as illustrated in FIG. 7, form a 6-bit binary number identifying the bit position of the first one in the 64-bit fraction. This number also identifies the number of trailing zeros.

It will be appreciated that the trailing-zeros-detector circuit shown in FIG. 7 can also be used as a leading zeros detector by simply mirroring the 64-bit input.

What is claimed is:

1. A method of subtracting two floating-point binary numbers in a pipelined floating-point adder/subtractor in a digital computer, each of said numbers having a fraction, an exponent and a sign, said method comprising the steps of aligning the two fractions for subtraction, arbitrarily designating the fraction of one of the two floating-point numbers as the subtrahend, subtracting the designated fraction from the other fraction to obtain a corresponding difference, and normalizing said difference, determining whether said difference is negative and, when it is, complementing the normalized difference, and selecting the larger of the exponents of said two floating-point numbers, and adjusting the value of the selected exponent in accordance with the normalization of said difference.

2. The method of claim 1 wherein said aligning step shifts to the right the fraction associated with the smaller exponent, and the shift is a number of bit positions equal to the numerical difference between the two exponents.

3. The method of claim 1 wherein said subtracting step is carried out in an adder that has two inputs and always receives at a preselected one of said two inputs the fraction which is not designated as the subtrahend.

4. The method of claim 1 wherein said step of determining whether said result is negative comprises detecting when the most significant bit of said difference is set.

5. The method of claim 1 which includes the step of rounding said normalized difference by adding thereto a rounding constant, and said complementing of said normalized difference is performed during said rounding step.

6. The method of claim 5 wherein the complementing of said normalized difference is performed by an adder/subtractor that adds a rounding constant, and adds a carry-in bit when said difference is negative.

7. The method of claim 1 wherein said aligning step comprises shifting one of the two fractions to the right, and which includes the steps of determining the number of consecutive zeros in said one fraction, prior to the shifting thereof, beginning at the least significant bit position, comparing (1) the number of positions said one fraction is shifted in the aligning step, with (2) said number of consecutive zeros in said one fraction, and producing a sticky bit signal when said number of consecutive zeros is less than the number of positions said one fraction is shifted in the aligning step, said sticky bit signal indicating the truncation of at least one set bit during said aligning step.

8. The method of claim 7 which includes the step of preventing a carry-in during said subtracting of said designated fraction in response to the production of a sticky bit signal when the fraction shifted during said aligning step is the fraction designated as said subtrahend.

9. The method of claim 7 which includes the steps of rounding said normalized difference by adding thereto a rounding constant, and preventing a carry-in during said rounding step in response to the production of a sticky bit signal when the fraction shifted during said aligning step is not the fraction designated as said subtrahend.

10. A method of subtracting two floating-point binary numbers in a pipelined floating-point adder/subtractor in a digital computer, each of said numbers having a fraction, an exponent and a sign, the exponent of one of said numbers being smaller than the exponent of the other of said numbers, said method comprising the steps of aligning the two fractions for subtraction by shifting one of the two fractions to the right, said one of the two fractions being the fraction associated with the smaller exponent, determining the number of consecutive zeros in said one fraction, prior to the shifting thereof, beginning at the least significant bit position, comparing (1) the number of positions said one fraction is shifted in the aligning step, with (2) said number of consecutive zeros in said one fraction, and producing a sticky bit signal when said number of consecutive zeros is less than the number of positions said one fraction is shifted in the aligning step, said sticky bit signal indicating the truncation of at least one set bit during said aligning step.

11. The method of claim 10 wherein the number of positions said one fraction is shifted in said aligning step is equal to the numerical difference between the exponents of said two numbers.

12. A method of subtracting two floating-point binary numbers in a pipelined floating-point adder/subtractor in a digital computer, each of said numbers having a fraction, an exponent and a sign, said method comprising the steps of aligning the two fractions for subtraction by shifting to the right the fraction associated with the smaller exponent, by a number of bit positions equal to the numerical difference between the two exponents, subtracting one of said fractions from the other of said fractions, after said fractions have been aligned for subtraction, in an adder/subtractor that receives the two fractions at two inputs, the fraction received at a preselected one of said two inputs always being the fraction designated as the subtrahend, normalizing the result produced by the subtraction step, determining whether said result is negative and, when it is, complementing the normalized result, and selecting the larger of the exponents of said two floating-point numbers, and adjusting the value of the selected exponent in accordance with the normalization of said result.

13. The method of claim 12 wherein the fraction received at said preselected input is selectively complemented in response to the exclusive ORing of a signal representing the sign of one of said numbers, a signal representing the sign of the other of said numbers, and a signal commanding a subtraction of said two numbers.

14. The method of claim 12 wherein said step of determining whether said result is negative comprises detecting when the most significant bit of said result is set.

15. The method of claim 12 which includes the step of rounding said normalized result by adding thereto a rounding constant, and said complementing of said normalized result is performed during said rounding step by an adder/subtractor which performs the adding of the rounding constant.

16. The method of claim 15 wherein said complementing of said normalized result is performed in response to detection of a set bit in the most significant bit position of said result.

17. The method of claim 12 which includes the steps of
determining the number of consecutive zeros in said one fraction, prior to the shifting thereof, beginning at the least significant bit position,
comparing (1) the number of positions said one fraction is shifted in the aligning step, with (2) said number of consecutive zeros in said one fraction, and
producing a sticky bit signal when said number of consecutive zeros is less than the number of positions said one fraction is shifted in the aligning step, said sticky bit signal indicating the truncation of at least one set bit during said aligning step.

18. The method of claim 17 which includes the steps of rounding said normalized result by adding thereto a rounding constant, and
preventing a carry-in during said rounding step in response to the production of a sticky bit signal when the fraction shifted during said aligning step is not the fraction designated as said subtrahend.

19. The method of claim 12 which includes the step of preventing a carry-in during said subtracting step in response to the production of a sticky bit signal when the fraction shifted during said aligning step is the fraction designated as said subtrahend.

20. A pipelined floating-point adder/subtractor for subtracting two floating-point binary numbers in a digital computer, each of said numbers having a fraction, an exponent and a sign, said adder/subtractor comprising
means for aligning the two fractions for subtraction,
a complementing unit for selectively complementing one of the fractions of the two floating point numbers arbitrarily designated as the subtrahend,
an adder having two inputs, one of said inputs being connected to an output of said complementing unit, and the other of said inputs receiving the one of the two fractions which is not designated as the subtrahend,
normalizing means for normalizing the result produced by said adder,
means for determining whether said result is negative and, when it is, complementing said normalized result, and
an exponent processing unit for selecting the larger of the exponents of said two floating-point numbers, and adjusting the value of the selected exponent in accordance with the normalization of said result.

21. The pipelined floating-point adder/subtractor of claim 20 wherein the complement of the designated fraction is produced after said alignment of the two fractions for subtraction.

22. The pipelined floating-point adder/subtractor of claim 20 wherein said aligning means shifts to the right the fraction associated with the smaller exponent, and the shift is a number of bit positions equal to the numerical difference between the two exponents.

23. The pipelined floating-point adder/subtractor of claim 22 which includes means for the exclusive ORing of a signal representing the sign of one of said numbers, a signal representing the sign of the other of said numbers, and a signal commanding a subtraction of said two numbers, to produce a control signal for controlling said complementing unit.

24. The pipelined floating-point adder/subtractor of claim 20 wherein said means for determining whether said result is negative comprises means for detecting when the most significant bit of said result is set.

25. The pipelined floating-point adder/subtractor of claim 20 which includes means for rounding said normalized result by adding thereto a rounding constant, and wherein said means for adding thereto a rounding constant receives a carry-in for complementing aid normalized result.

26. The pipelined floating-point adder/subtractor of claim 25 wherein said means for determining whether said result is negative includes means for detecting when the most significant bit of said result is set.

27. The pipelined floating-point adder/subtractor of claim 22 wherein said aligning means comprises means for shifting one of the two fractions to the right, and which includes
a trailing zeros detector for determining the number of consecutive zeros in said one fraction, prior to the shifting thereof, beginning at the least significant bit position,
comparison means for comparing (1) the number of positions said one fraction is shifted in the aligning step, with (2) said number of consecutive zeros in said one fraction, and producing a sticky bit signal when said number of consecutive zeros is less than the number of positions said one fraction is shifted in the aligning step, said sticky bit signal indicating the truncation of at least one set bit during said aligning step.

28. The pipelined floating-point adder/subtractor of claim 27 which includes means for preventing a carry-in during said adding step in response to the production of a sticky bit signal when the fraction shifted during said aligning step is the fraction designated as said subtrahend.

29. The pipelined floating-point adder/subtractor of claim 27 which includes
means for rounding said normalized result by adding thereto a rounding constant, and
means for preventing a carry-in during said rounding step in response to the production of a sticky bit signal when the fraction shifted during said aligning step is not the fraction designated as said subtrahend.

30. A pipelined floating-point adder/subtractor for subtracting two floating-point binary numbers is a digital computer, each of said numbers having a fraction, an exponent and a sign, the exponent of one of said numbers being smaller than the exponent of the other of said numbers, said adder/subtractor comprising
means for aligning the two fractions for subtraction by shifting one of the two fractions to the right, said one fraction being the fraction associated with the smaller exponent,
a trailing zeros detector for determining the number of consecutive zeros in said one fraction, prior to the shifting thereof, beginning at the least significant bit position,
comparison means for comparing (1) the number of positions said one fraction is shifted in the aligning step, with (2) said number of consecutive zeros in said one fraction, and producing a sticky bit signal when said number of consecutive zeros is less than the number of positions said one fraction is shifted in the aligning step, said sticky bit signal indicating the truncation of at least one set bit during said aligning step.

31. The pipelined floating-point adder/subtractor method of claim 30 wherein the number of positions said one fraction is shifted by said aligning step is equal to the numerical difference between the exponents of said two numbers.

32. A method of subtracting two floating-point binary numbers in a pipelined floating-point adder/subtractor in a digital computer, each of said numbers having a fraction, an exponent and a sign, said method comprising the steps of aligning the two fractions for subtraction, arbitrarily designating the fraction of one of the two floating-point numbers as the subtrahend, subtracting said designated fraction from the other fraction to obtain a difference, and normalizing said difference, determining whether said difference is negative and, when it is, complementing the normalized difference, rounding said normalized difference, and selecting the larger of the exponents of said two floating-point numbers, and adjusting the value of the selected exponent in accordance with the normalization of said difference, wherein the complementing of said normalized difference is performed during the rounding of said difference by an adder/subtractor that adds a rounding constant, and adds a carry-in bit when said difference is negative.

33. The method as claimed in claim 32, wherein the aligning step comprises shifting one of the two fractions, and the method further comprises preventing the adding of said carry-in bit in response to the production of a sticky bit signal when the fraction shifted during said aligning step is the fraction that is not designated as said subtrahend.

34. The method of claim 32 which includes the step of preventing a carry-in during said subtracting of said designated fraction in response to the production of a sticky bit signal when the fraction shifted during said aligning step is the fraction designated as said subtrahend.

35. The method of claim 32, wherein said aligning step comprises shifting one of the two fractions, and the method further includes the steps of determining the number of consecutive zeros in said one fraction, prior to the shifting thereof, beginning at the least significant bit position, comparing (1) the number of positions said one fraction is shifted in the aligning step, with (2) said number of consecutive zeros in said one fraction, and producing a sticky bit signal when said number of consecutive zeros is less than the number of positions said one fraction is shifted in the aligning step, said sticky bit signal indicating the truncation of at least one set bit during said aligning step.

* * * * *